(No Model.) 6 Sheets—Sheet 6.
F. H. RICHARDS.
STOP MOTION REGISTER FOR GRAIN SCALES.
No. 408,192. Patented July 30, 1889.
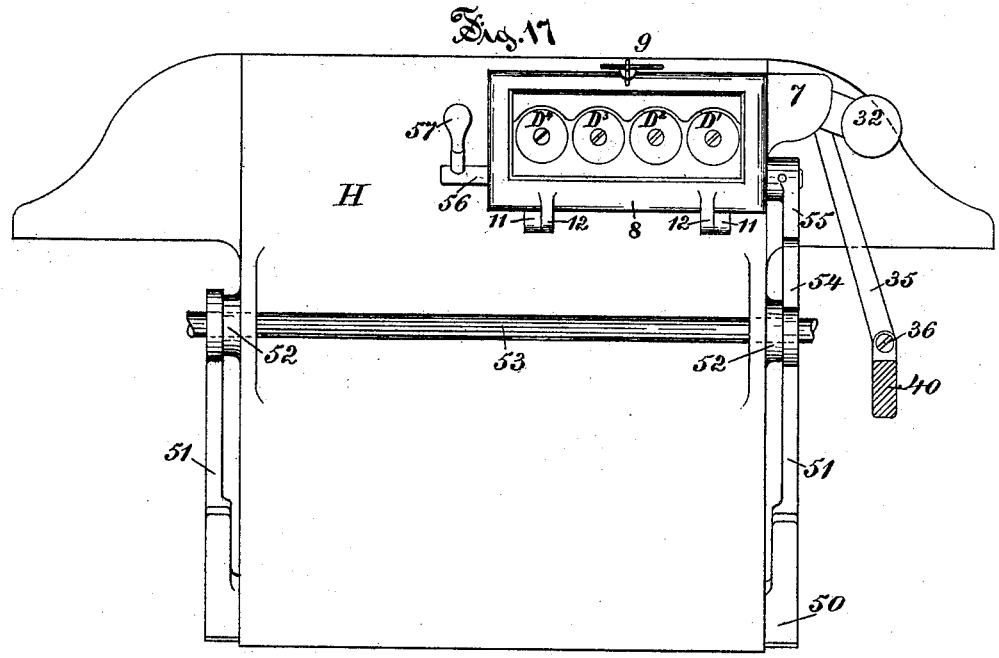
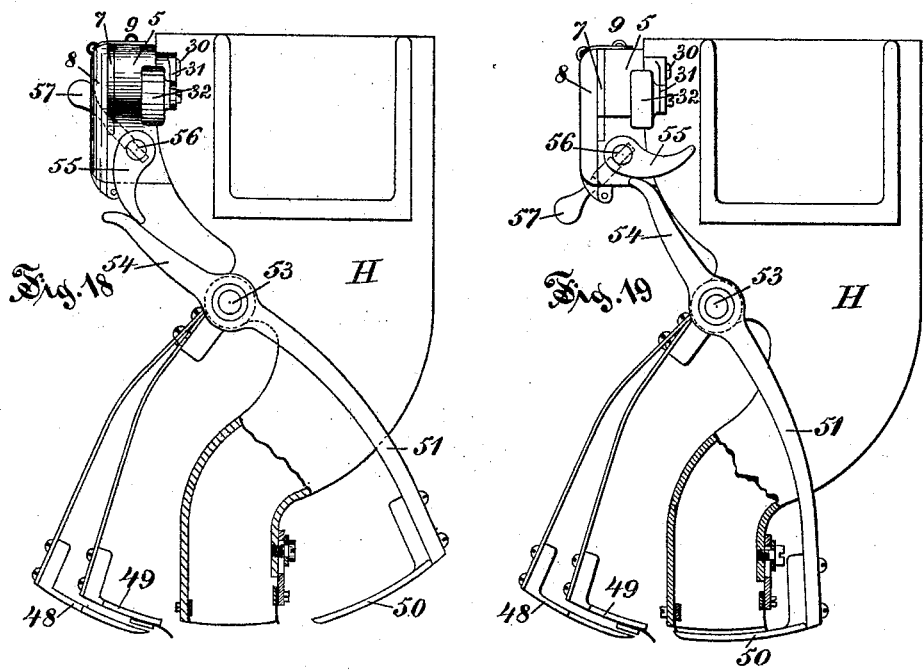
Witnesses:
Geo. W. Drake
L. L. Heermann
Inventor:
Francis H. Richards.

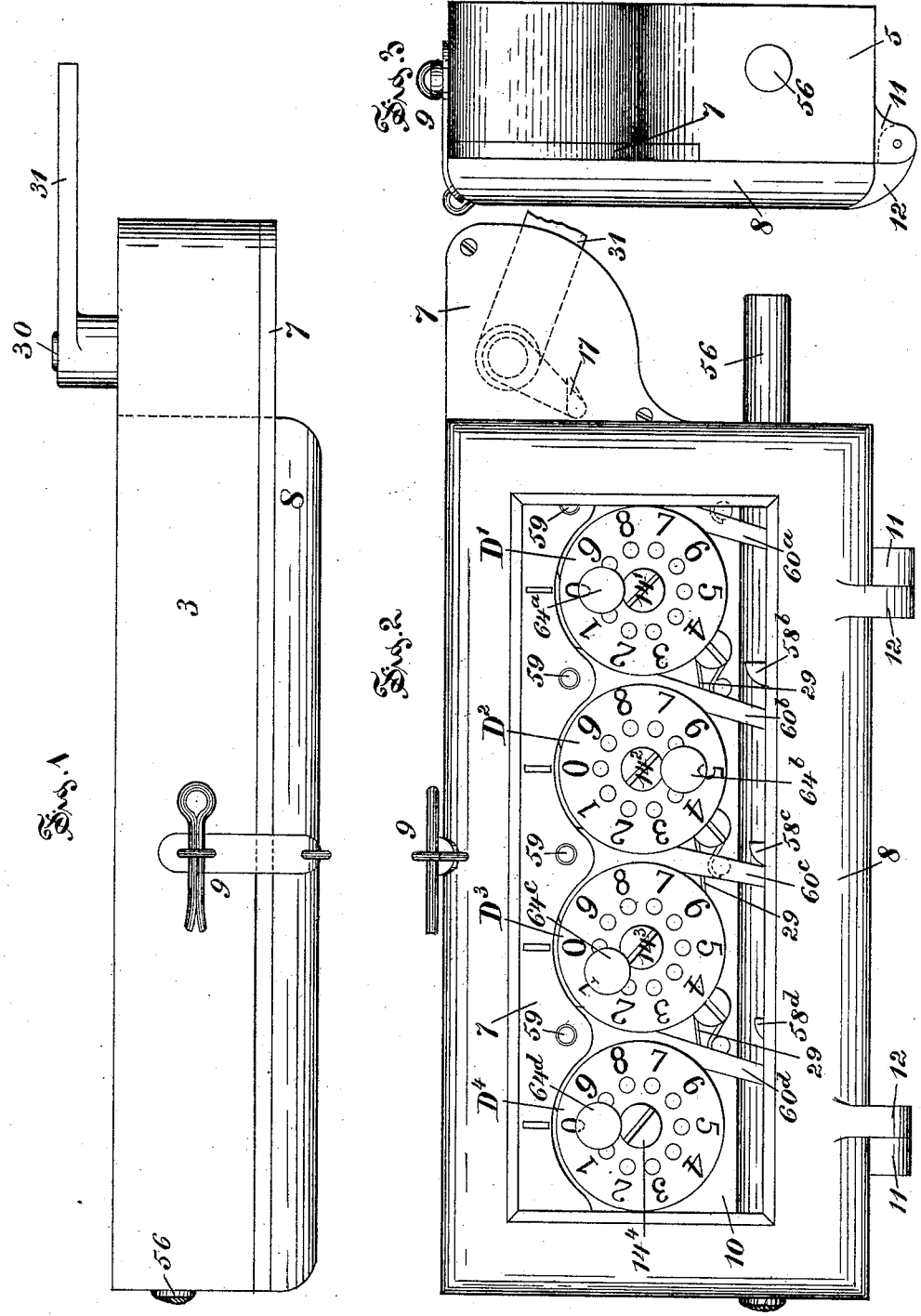

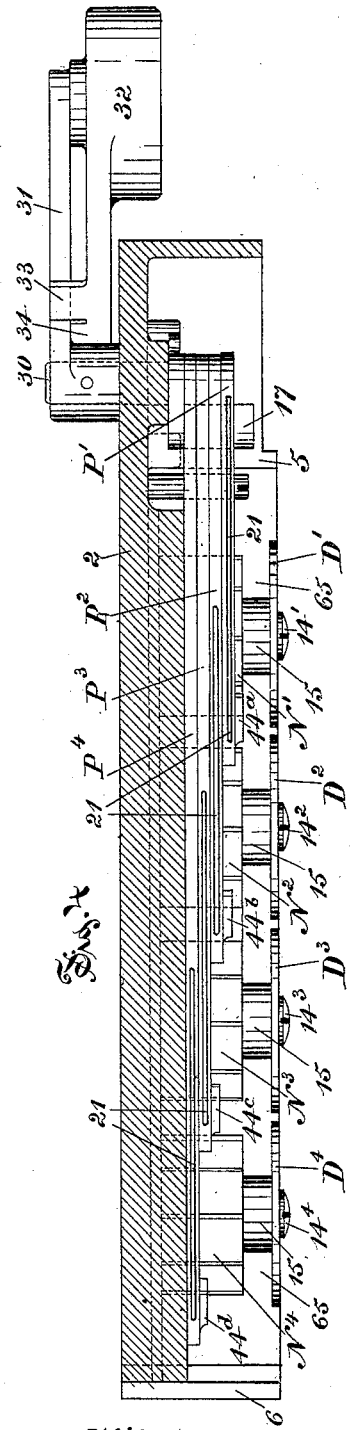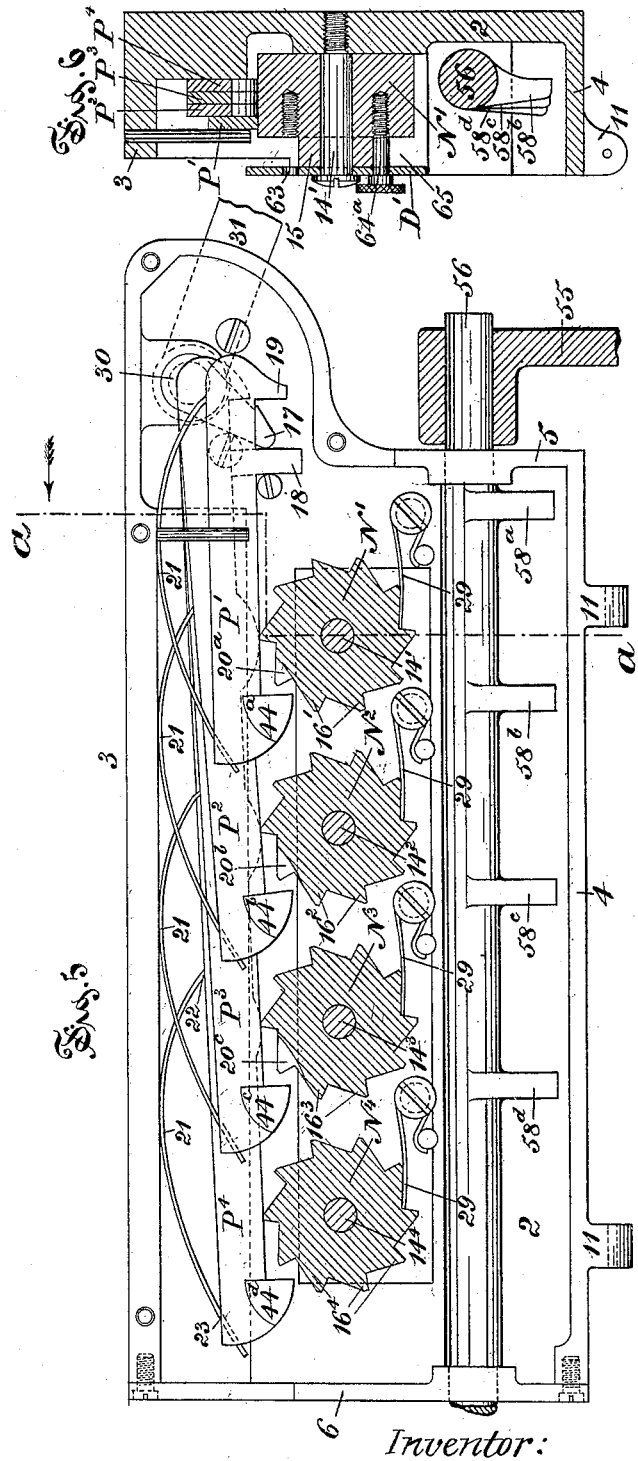

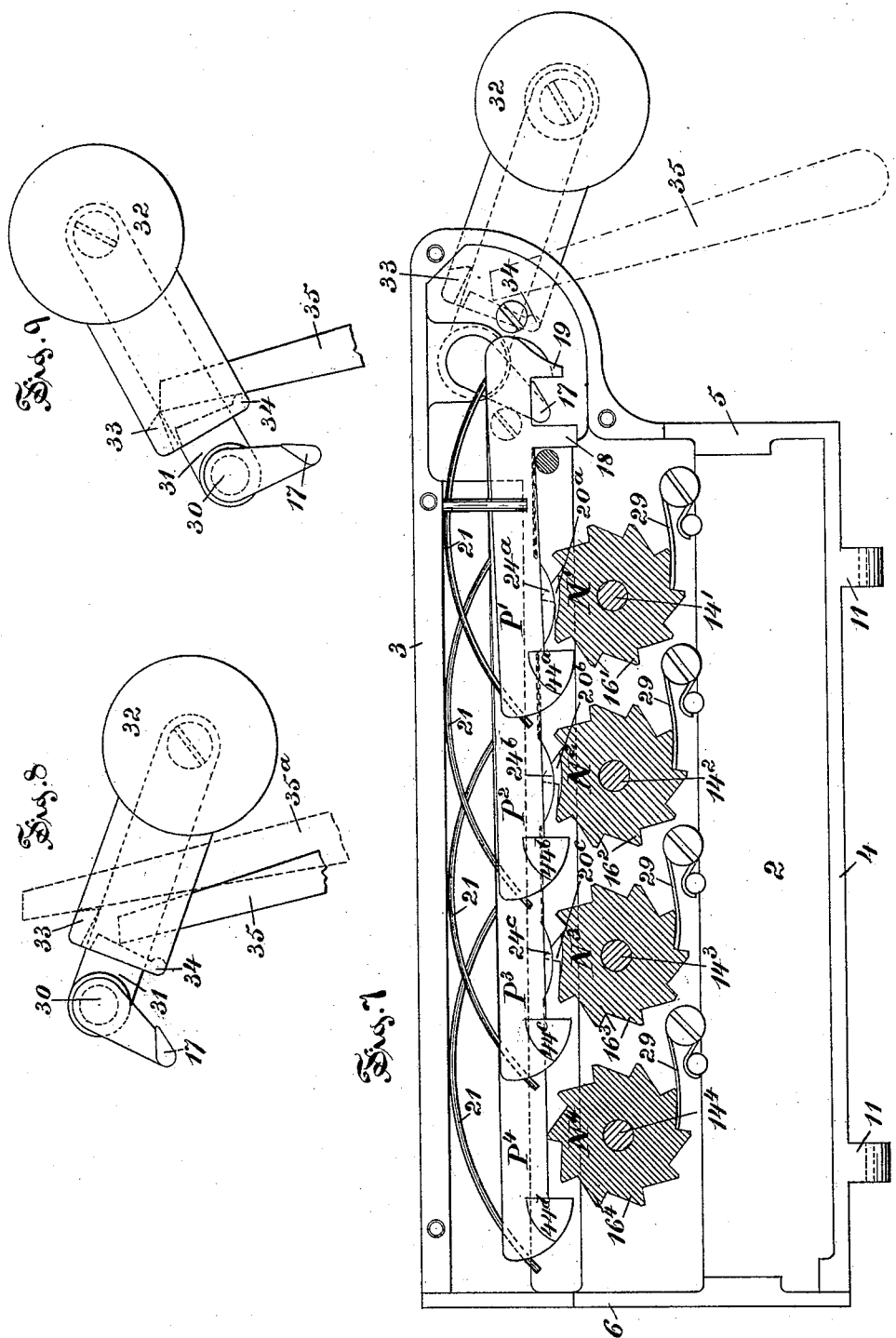

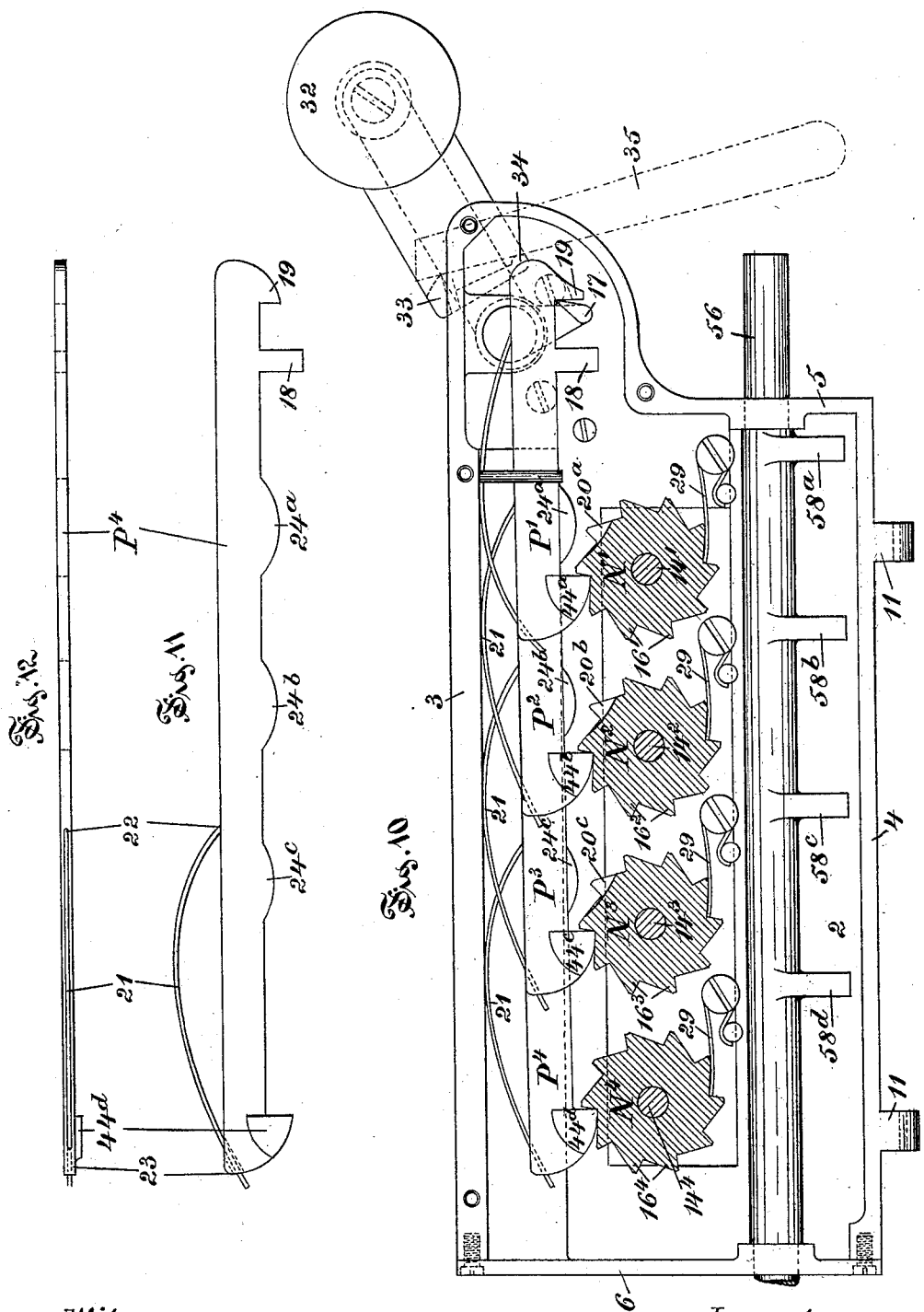

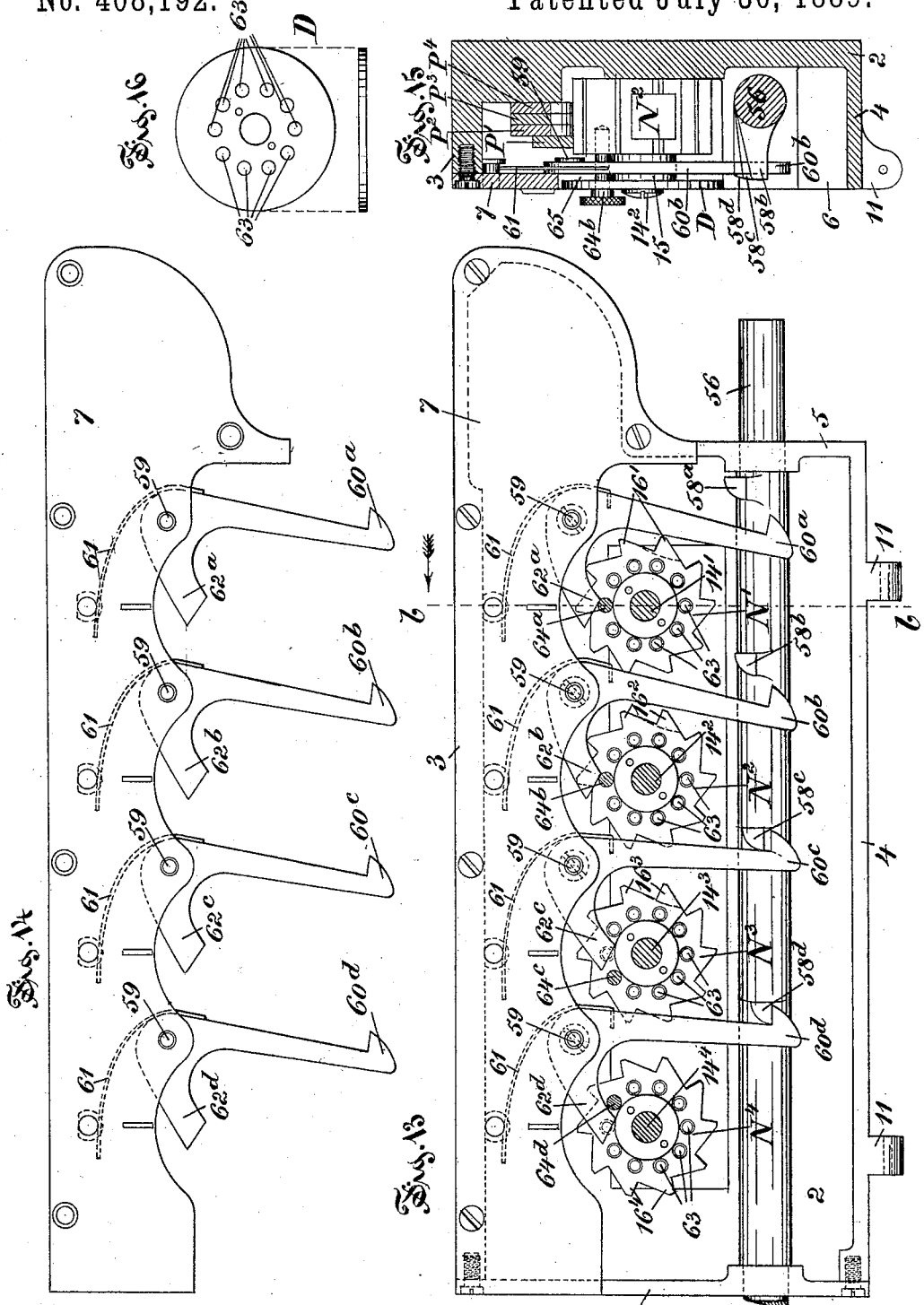

UNITED STATES PATENT OFFICE.

FRANCIS H. RICHARDS, OF HARTFORD, CONNECTICUT, ASSIGNOR TO THE PRATT & WHITNEY COMPANY, OF SAME PLACE.

STOP-MOTION REGISTER FOR GRAIN-SCALES.

SPECIFICATION forming part of Letters Patent No. 408,192, dated July 30, 1889.

Application filed October 15, 1888. Serial No. 288,152. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Stop-Motion Registers for Grain-Scales, of which the following is a specification.

This improved mechanism counts and registers the vertical strokes of the scale-beam of a grain-scale and other weighing machines or apparatuses to which the same may be applied, and is provided with stop-motion devices for automatically stopping the operation of such weighing-machine whenever a predetermined number of scale-beam movements have been registered.

In the drawings accompanying and forming a part of this specification, Figure 1 is a plan view of my improved stop-motion and register in its casing. Fig. 2 is a front elevation of the same. Fig. 3 is an elevation of the right-hand end in Fig. 2. These three views are drawn in projection with each other. Fig. 4 is a plan view in which the upper part of the frame or casing is broken away, showing the disk-actuating devices. Fig. 5 is a front elevation in which the front plate and a part of the stop-motion devices are removed to better show the said disk-actuating devices. Fig. 6 is a sectional elevation of the parts in Fig. 5 at the left hand of line $a\ a$. Figs. 4, 5, and 6 are also drawn in projection with each other. Fig. 7 is a front view similar to Fig. 6, showing the parts in a different position, and is illustrative of the operation of the disk-actuating devices. Figs. 8 and 9 illustrate the operation of the actuating-pawl and lever. Fig. 10 is a front view similar to Figs. 5 and 7 and further illustrative of the operation of the mechanism. Figs. 11 and 12 are a side and top view, respectively, of one of the disk-actuating pawls. Fig. 13 is a front view showing the stop-motion hooks in place, together with the front plate carrying said hooks. For clearness of illustration, the disk-actuating devices are not shown in this view. Fig. 14 shows the front plate and said hooks removed from the apparatus. Fig. 15 is a sectional view similar to Fig. 6 in line $b\ b$, Fig. 13. Fig. 16 shows one of the register-disks in two views. Fig. 17 is a front view of the supply-chute of a grain-scale, showing my improved mechanism attached thereto. Fig. 18 is a side elevation of the same, partially in section and as seen from the right hand in Fig. 17. Fig. 19 is a view similar to Fig. 18, illustrating the operation of the stop-motion.

Similar characters designate like parts in all the figures.

Following the usual practice in the manufacture of registering apparatuses, I make the frame-work of my improved mechanism in the form of a box or casing that incloses the operative details, this being done for the purpose of excluding dust or other obstructions, and not because such form of frame-work is indispensable to the proper operation of the apparatus. As shown in the drawings, the casing consists of the back plate or wall 2, the top plate 3, the bottom plate 4, provided with lugs 11, the right-hand end wall 5, the left-hand end wall 6, the front plate 7, for carrying the stop-motion hooks, and the cover 8, which has lugs 12 pivoted to the lugs 11 on plate 4, and is provided with some suitable and well-known clasp or lock, as 9, for holding the same closed. The cover 8 usually has therein a glass plate 10, through which to observe the disks and other parts within the case.

For carrying the register disks or dials $D'$, $D^2$, $D^3$, and $D^4$, respectively, the back plate 2 has a like series of fixed studs $14'\ 14^2\ 14^3\ 14^4$, which parts are referred to in a general way without choice or collectively as "disk" or "disks" D and "stud" or "studs" 14, respectively. The same principle and mode of designation are, for convenience, adopted herein with respect of other duplicate details. Said disks are each provided with a toothed wheel or ratchet-cylinder N, which is affixed to the disk by a projecting hub 15 and turns freely on its stud. Each cylinder M has ten teeth 16, whereby the same is actuated, as hereinafter explained, and all said teeth face in the same direction when the whole apparatus is organized and arranged in all respects as herein shown and described. Spring-detents 29 are provided, usually, to prevent any backward rotation of the cylinders. For actuating the ratchet-cylinders N, a corresponding series of rods or pawls P are employed, which lie contiguous to the wheels N, and are all (with the exception of variation, hereinafter set forth and shown in the drawings) similarly shaped at the right-hand end (in Figs. 4, 5, 7, 10, 11, and 12) to engage with and be operated from the oscillating crank-pin 17, that lies between the projections 18 and hooks 19 on said pawls. The proper stroke of said crank-pin and of said pawls P, in view of the proportions of the several co-acting parts, will be seen by comparison of Figs. 5, 6, and 10 and of Figs. 8 and 9, such movement being somewhat in excess of the distance between the points of adjacent teeth 16 on cylinders N.

Each pawl P is provided with a hook or pawl proper 44 for engaging said notches 16, and with a light spring 21, which is affixed at one end 22 to the pawl, rests thereon or therein freely at the other end 23, and in the middle part thereof bears against the upper wall or plate 3. These springs serve to normally hold each pawl down against all those cylinders N which lie underneath the same.

The arrangement of the several pawls P is such that the first one P' bears on cylinder N' only, the second P² reaches over cylinder N' and actuates cylinder N², the third P³ reaches over cylinders N' and N² and actuates cylinder N³, and the fourth P⁴ reaches over cylinders N', N², and N³ and actuates cylinder N⁴. This arrangement will be understood from and by making comparison of Figs. 4, 5, and 6. Besides this, one of the ratchet-teeth on each cylinder, except the last one N⁴, is cut away in that part of its length which underlies all the pawls except its own. For instance, the tooth 20ª of cylinder N' is cut away under the pawls P², P³, and P⁴. Tooth 20ᵇ of cylinder N² is cut away under pawls P³ and P⁴, and tooth 20ᶜ of cylinder N³ is cut away under pawl P⁴. Furthermore, each pawl has a stop-bearing arranged to rest on each cylinder, except the last one, over which such pawl passes—that is to say, the pawl P' passes over only one cylinder N' and has no stop-bearing, the pawl P² passes over two cylinders N' and N² and has one stop-bearing 24ª to rest on the cylinder N', the pawl P³ passes over three cylinders N', N², and N³ and has two stop-bearings 24ª and 24ᵇ, and the pawl P⁴ passes over four cylinders N', N², N³, and N⁴ and has three stop-bearings 24ª, 24ᵇ, and 24ᶜ resting on said first three cylinders, respectively. These several parts are to be so constructed and fitted together that the pawl P' turns cylinder N' through the space of one notch or tooth 20 for each double stroke of the crank-pin 17, after the manner of an ordinary pawl-and-ratchet motion. This operation continuing until the bearing 24ª of pawl P² drops into space 20ª of cylinder N' at the next forward movement of the pawls, (toward the right hand in Figs. 5, 7, and 10,) the pawl P² (being thus lowered) catches one of the notches 16² of cylinder N² and falls into engagement with the driving-crank 17, which then lies between the projection 18 and hook 19 thereof, and thus turns the said cylinder forward. In like manner, whenever the spaces 20ª and 20ᵇ both stand directly above studs 14, the two stop-bearings of pawl P³ drop into said spaces, and this pawl being thus lowered catches one of the teeth 16³ of cylinder N³, and also the driving-crank 17, and turns the said cylinder N³ forward, and, likewise, whenever the spaces 20ª, 20ᵇ, and 20ᶜ all stand above studs 14, then the pawl P⁴ drops down and catches the teeth 16⁴, and also the said crank to turn forward cylinder N⁴. It will be observed in this connection that the hook 19 of pawl P' is longer than on the other said pawls, so that it always engages the crank 17.

That construction of the hooks 19 of the pawls P², P³, and P⁴ whereby said pawls are disconnected at times from their driving-arm 17 is not indispensable to my invention; but this feature has the advantage of reducing to a minimum the wear of said pawls and of the cylinders N; but in case these pawls are permanently connected to said arm, (as pawl P' is shown to be by means of the longer hook 19 thereof,) then the hooks 44 should be made short enough vertically to clear the cylinder-tooth in position 20, Fig. 5, except when the stop-bearing rests in the space 20, Fig. 7.

The ratchet-cylinders N, it will be observed, are, when actuated by the above-described devices, all revolved intermittently in the same direction; also, that the power for turning each of said cylinders is furnished by a direct connection from the crank or driving-arm 17, so that no "slack" or "play" accumulates from wheel to wheel to vitiate the accuracy of the operation of the furthermost wheel, this being a well-known and serious defect in the ordinary forms of counting or registering apparatus. The several cylinders N form a "Jacquard" apparatus, in which a certain number of the cylinders together form a pattern for causing the operation in proper time of the cylinder next beyond them, which causation is effected, as above explained, by the ratchet-spaces 20 of one or more cylinders allowing the actuating-pawl to drop down into engagement with the driving-crank for actuating such pawl to turn another cylinder. This principle, whose adaptation to this class of mechanism I claim broadly, and which may be readily extended to actuate any desired number of register-disks, has in practice useful and important advantages, and among others these: Any desired number of disks may be used without accumulation of lost motion, as above explained. The disks all turn in the same direction, which greatly facilitates the proper management of the apparatus by unskilled laborers. The disks may be set at any desired distance apart within wider limits than occurring in general practice. Any disk may be turned forward by hand without disturbing the others, and these features facilitate setting the disks and the stop-motion pins, hereinafter described, to indicate the desired number at which the grain-scale shall stop.

For actuating the pawls P, I employ, as above stated, a crank or driving-arm 17, and I usually attach this part to a rock-shaft 30, journaled in the frame-work, and having thereon a lever 31, whereby the same is operated. This lever I provide with a weight 32 sufficient to throw the pin 17 toward the left hand; also, with a catch 33, whereby to lift the lever, and a stop 34, for disengaging the lifting-arm 35 from said catch at the uppermost part of its stroke, which is shown in Fig. 9.

The arm 35, (see Fig. 17,) which is in the nature of a pawl, is pivotally attached at 36 to the scale-beam 40 of a grain-scale, which beam may be that of the well-known "Hill" grain-scale described in prior United States Patents. Said beam has an upward motion of fixed amount immediately after each discharge of a weighed load of grain, and hence the arm 35 operates to register that load at once on completion and discharge of the same. In order, however, to properly actuate said mechanism, and also to leave said beam 40 free of restraint while standing in its uppermost position, the stop 34 is provided to operate in conjunction with catch 33. When the beam 40 descends, as set forth in said prior patents to Hill, the arm or pawl stands as in Figs. 7 and 8. When the beam rises, the arm 35 first strikes catch 33 and carries up lever 31, as in Fig. 9, and then the stop 34, being below shaft 30 and having some sidewise movement oppositely to said catch, pushes the said arm 35 out from under said catch, whereupon the lever falls to its position in Fig. 8, and the arm 35 remains in the dotted position 35$^a$ until the next downward motion of the scale-beam.

The stop-motion devices consist of a cut-off or stop valve, a movable part or rock-shaft and connections for opening said valve, hooks locking said shaft to hold open said valve, and stop-pins adjustable circumferentially of the register-disks for actuating the hooks to unlock the valve at a predetermined time. The valve 50, Figs. 17, 18, and 19, is usually affixed by depending arms 51, which are pivotally supported at some suitable and convenient point on the machine. For this purpose the chute or hopper H of the grain-scale has or may have bearings 52 for a shaft 53, that carries or supports said valve-arms. This shaft is the one usually provided in the said class of grain-weighers to carry the cut-off valves 48 49, Fig. 18. One of the arms 51 (or the shaft 53, if this is fixed in said arm) has a second arm or extension 54, through which the valve is actuated by the arm or lever 55 of the stop-motion shaft 56. This shaft 56 is journaled in the end walls 5 and 6 of the register-casing, and has a handle 57 for turning the same by hand when setting the apparatus to start the grain-scale operating. Shaft 56 also has a series of stop-arms or notches 58 corresponding to the disks D, respectively. Hooks 60 are pivotally supported at 59 on the front plate 7, are normally held in engagement with said arm 58 (when these are up, as in Fig. 13) by springs 61, and each has a cam-arm 62, which is acted upon by a stop-pin 64, that is carried by disk D, to disengage said hook from the catch 58. The said pin 64 is adapted to be inserted in any one of the series of holes 63 and extends through the disk D across the space between said disk and cylinder N and (usually) into said cylinder. The cam-arm 62 lies within said space 65 and close to the hub 15. When the pin 64 comes to the zero-point, as at 62$^a$, Fig. 13, it lifts the cam-arm and moves the hook 60 out from beneath the stop-arm 58, and when this happens to all the said hooks at the same time the shaft is free to turn and the stop-valve closes by its own weight, or is closed by a weight, spring, or other means. (Not shown.)

The arms 58 are set on the shaft 56 at a gradually-increasing height relative to hooks 60, so that the weight thereof shall rest on only one hook at the same time. This is to permit all the hooks except the last one in engagement to be operated without lowering said arms. This feature is shown in Fig. 13, in which all the stop-pins are set to be used, the weight all resting on the last hook 60$^d$. If now the pin 64$^d$ lifts cam-arm 62$^d$, the hook 60$^d$ is disengaged from arm 58$^d$ and the weight falls onto hook 62$^c$, and when the arm 62$^d$ is released the hook 60$^d$ does not re-engage with arm 58$^d$, but strikes against one side thereof, and is henceforth out of use until the shaft 56 is at some later time again reset by hand. This action of the apparatus continues until all the hooks are successively disengaged, beginning with the left-hand one.

In setting the register for use the disks D are all turned to the zero-point, as in Fig. 2, and the pins 64 are set to indicate the number of movements to be registered when the stop-motion shall act. This is done by setting the said stop-pins to indicate the required number on said disks, as follows: On disk D' the stop-pin is set at 0 to indicate no units; pin 64$^b$ is set to indicate 5 (tens;) pins 64$^c$ to indicate 1 (hundreds,) and pin 64$^d$ to indicate 0 (thousands.) The required number then is shown in Fig. 2 to be 0150, or one hundred and fifty, and when the pins are so set when the grain-scale is started the stop-valve closes when one hundred and fifty loads have been weighed and discharged. In like manner any other predetermined number may be used.

Having thus described my invention, I claim—

1. In a register mechanism, the combination of a series of toothed wheels carrying register-dials and a corresponding series of reciprocatable pawls lying contiguous to said wheels for actuating said wheels, respectively, said wheels each having a space therein under each pawl except its own, all substantially as described.

2. In a register mechanism, the combination of the toothed wheels N and of a corresponding series of pawls P, for actuating said wheels, respectively, and a reciprocating arm for actuating said pawls, said wheels each having a space underneath each pawl except its own, all substantially as described.

3. In a register mechanism, the combination of the wheels N' and N², driving-arm 17, pawl P', connected with said arm for actuating wheel N', and pawl P², adapted to be engaged with said arm for actuating wheel N², said wheel N' having a space at one point in its circumference under said pawl P², whereby the latter is let into engagement with said driving-arm once during each revolution of wheel N', substantially as described.

4. In a register mechanism, the combination of the vertically-reciprocating beam 40, driving-arm 35, connected thereto, and lever 31, having catch 33 and stop 34, substantially as described.

5. The combination, with register mechanism, of the driving-arm 17, lever 31, operating said arm and provided with catch 33 and stop 34, and having a weight for performing the work of moving forward the dials, and the arm 35, engaging with and lifting said lever by said catch, and then detaching therefrom by said stop, substantially as described.

6. In a stop-motion register, the combination of the intermittingly-revolving stop-cylinder, stop-pins set in said cylinders, a corresponding series of hooks operated by said pins, respectively, and a stop-shaft having stop-arms engaging with said hooks, all substantially as described.

7. In a stop-motion register, dials carrying stop-pins, hooks actuated from said pins, and a series of stop-arms engaging with said hooks, said arms projecting from one movable part and being set at a gradually-increasing height, all being organized and coacting substantially as described.

8. In a stop-motion and register for grain-scales, the combination of the supply-chute, the stop-valve, hooks operatively connected to lock said valve open, and register-dials carrying stop-pins located therein to detach said hooks at a predetermined time, all substantially as described.

9. In a stop-motion and register for grain-scales, the combination of the supply-chute, the stop-valve, a lever actuating said valve to open the same, cam-arm 55, hooks locking said cam-arm in position to hold the valve open, and register-dials carrying stop-pins set to detach said hooks at a predetermined time, all substantially as described.

10. In a stop-motion register, the register-dials figured and intermittingly revolved, substantially as described, and having circumferentially thereof stop-pin holes corresponding to the figures thereon, in combination with stop-pins insertible in said holes and valve-locking hooks constructed to be detached by cam-arms operated by said pins, all substantially as described.

11. In a register mechanism, the combination of the dial D, perforated as set forth, cylinder N, carrying said dial and correspondingly bored, a stop-pin insertible in the holes of said dial and cylinder, and the hook having a cam-arm normally standing in the path of said pin between said dial and cylinder, all substantially as described.

12. In a stop-motion register, the combination of cylinders N, carried by toothed wheels and carrying stop-pins, substantially as described, the rock-shaft having stop-arms 58, and hooks 60, pivotally supported on the frame and having cam-arms 62, all organized and coacting substantially as described.

FRANCIS H. RICHARDS.

Witnesses:
SAML. W. POWEL,
HENRY L. RECKARD.